United States Patent
Zhang et al.

(10) Patent No.: US 10,264,053 B2
(45) Date of Patent: Apr. 16, 2019

(54) METHOD, APPARATUS, AND SYSTEM FOR DATA TRANSMISSION BETWEEN MULTIPLE DEVICES

(71) Applicant: TENCENT TECHNOLOGY (SHENZHEN) COMPANY LIMITED, Shenzhen (CN)

(72) Inventors: Zheming Zhang, Shenzhen (CN); Le Wan, Shenzhen (CN); Zirong Zhu, Shenzhen (CN); Kun Yang, Shenzhen (CN); Jinhui Ruan, Shenzhen (CN); Hualiang Yan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 352 days.

(21) Appl. No.: 15/215,158

(22) Filed: Jul. 20, 2016

(65) Prior Publication Data

US 2016/0330272 A1 Nov. 10, 2016

Related U.S. Application Data

(63) Continuation of application No. PCT/CN2015/080783, filed on Jun. 4, 2015.

(30) Foreign Application Priority Data

Jun. 4, 2014 (CN) .......................... 2014 1 0244671

(51) Int. Cl.
*G06F 15/16* (2006.01)
*H04L 29/08* (2006.01)
*H04L 29/06* (2006.01)

(52) U.S. Cl.
CPC .......... *H04L 67/06* (2013.01); *H04L 65/4084* (2013.01); *H04L 65/608* (2013.01);
(Continued)

(58) Field of Classification Search
CPC ... H04L 65/4084; H04L 65/608; H04L 67/06; H04L 67/1063; H04L 67/1076; H04L 67/1091
See application file for complete search history.

(56) References Cited

U.S. PATENT DOCUMENTS

| 7,886,049 B2 * | 2/2011 | Adelstein ................ G06F 21/55 709/217 |
| 2009/0119386 A1 * | 5/2009 | Busser .............. H04L 29/12028 709/218 |

(Continued)

FOREIGN PATENT DOCUMENTS

| CN | 1494011 A | 5/2004 |
| CN | 101237337 A | 8/2008 |

(Continued)

OTHER PUBLICATIONS

The World Intellectual Property Organization (WIPO) International Search Report for PCT/CN2015/080783 dated Aug. 11, 2015 p. 1-3.
(Continued)

*Primary Examiner* — Mohamed A Wasel
(74) *Attorney, Agent, or Firm* — Anova Law Group, PLLC

(57) ABSTRACT

A method for reducing data transmission pressure of a server and to save network bandwidth resources includes sending advance backup data corresponding to multimedia files to N types of user terminals, where N>1; receiving a data request that is sent by an (N+1)th type of user terminal and is used for requesting a multimedia file; and sending, to the (N+1)th type of user terminal, a link address, of advance backup data corresponding to the multimedia file, in the N types of user terminals, the link address being used for instructing the (N+1)th type of user terminal to acquire, from the N types of user terminals, data corresponding to the multimedia file.

20 Claims, 8 Drawing Sheets

(52) U.S. Cl.
CPC ...... *H04L 67/1063* (2013.01); *H04L 67/1076* (2013.01); *H04L 67/1091* (2013.01)

(56) References Cited

U.S. PATENT DOCUMENTS

| | | | |
|---|---|---|---|
| 2010/0131596 A1* | 5/2010 | Im .................... | H04L 12/66 709/204 |
| 2011/0238828 A1* | 9/2011 | Grigsby ............ | H04L 67/104 709/224 |
| 2017/0068900 A1* | 3/2017 | Chen ................ | G06Q 30/0631 |
| 2017/0124071 A1* | 5/2017 | Huang .............. | G06F 17/2818 |
| 2018/0240069 A1* | 8/2018 | Yong ................ | G06F 3/0488 |

FOREIGN PATENT DOCUMENTS

| | | | |
|---|---|---|---|
| CN | 101409729 | A | 4/2009 |
| CN | 201491019 | U | 5/2010 |
| CN | 102065112 | A | 5/2011 |
| CN | 102929938 | A | 2/2013 |
| WO | 2009033401 | A1 | 3/2009 |

OTHER PUBLICATIONS

The State Intellectual Property Office of the People's Republic of China (SIPO) Office Action 1 for 201410244671.2 dated Aug. 2, 2017 pp. 1-10.

\* cited by examiner

METHOD, APPARATUS, AND SYSTEM FOR DATA TRANSMISSION BETWEEN MULTIPLE DEVICES

CROSS-REFERENCE TO RELATED APPLICATION

This application is a continuation application of PCT Application No. PCT/CN2015/080783, filed on Jun. 4, 2015, which claims priority to a Chinese patent application No. 201410244671.2, filed on Jun. 4, 2014, the content of all of which is incorporated herein by reference in their entirety.

FIELD OF THE TECHNOLOGY

The present disclosure generally relates to the technical field of communication applications, and in particular, relates to a data transmission method, apparatus, and system.

BACKGROUND OF THE DISCLOSURE

In existing video playback technologies, because more and more users watch videos online, network bandwidth cost for online video portal websites gradually increases. To reduce pressure of data transmission of a server and save network bandwidth cost, online video portal websites usually use a Peer to Peer (P2P) technology. In the P2P technology, when a user watches a video, a user terminal being used is used at the same time to upload a video resource being watched to another user, so as to reduce data traffic when the another user requests data from a server, thereby reducing network bandwidth pressure of the server.

A conventional P2P technology is usually applicable to data transmission of terminals of a same type. For example, on an online video portal website, a user A watches an online video 1 by using a Personal Computer (PC) 1. If a user B intends to watch the video 1 on the online video portal website by using a PC 2, first, the PC 2 acquires a seed file of the video 1 by using a backend server of the online video portal website; and second, the PC 2 acquires, according to the seed file, data of the video 1 that the user A is watching.

Problems arise, however, with existing varieties of terminals such as smart phones and tablet computers, conventional P2P data transmission between terminals of a same type can no longer implement P2P data transmission between terminals of different types. Therefore, for a server of each online video portal website, pressure of data transmission and growing cost of network bandwidth resources still exist.

SUMMARY

To reduce data transmission pressure of a server and to save network bandwidth resources, embodiments of the present invention provide a data transmission method, apparatus, and system.

According to a first aspect of the present disclosure, a data transmission method is provided, the method including:

sending advance backup data corresponding to multimedia files to N types of user terminals, where N≥1;

receiving a data request that is sent by an (N+1)th type of user terminal and is used for requesting a multimedia file; and sending, to the (N+1)th type of user terminal, a link address, of advance backup data corresponding to the multimedia file, in the N types of user terminals, the link address being used for instructing the (N+1)th type of user terminal to acquire, from the N types of user terminals, data corresponding to the multimedia file.

According to a second aspect of the present disclosure, a data transmission method is provided, the method including:

sending a data request corresponding to a multimedia file to a server;

receiving a link address, sent by the server according to the data request, of advance backup data corresponding to the multimedia file, in N types of user terminals, the advance backup data being backup data that is sent by the server to the N types of user terminals and corresponds to the multimedia file;

sending a first data request to the N types of user terminals according to the link address; and receiving advance backup data that is sent by the N types of user terminals according to the first data request and corresponds to the multimedia file.

According to a third aspect of the present disclosure, a data transmission method is provided, the method including:

receiving advance backup data, sent by a server, corresponding to multimedia files;

receiving a first data request, sent by an (N+1)th type of user terminal, for a multimedia file, the first data request being sent by the (N+1)th type of user terminal according to a link address, of advance backup data corresponding to the multimedia file, in N types of user terminals, and the link address being fed back by the server to the (N+1)th type of user terminal after the (N+1)th type of user terminal sends, to the server, a data request for the multimedia file, where N≥1; and sending, according to the first data request to the (N+1)th type of user terminal, the advance backup data corresponding to the multimedia file.

According to a fourth aspect of the present disclosure, a data transmission apparatus is provided, the apparatus including:

a sending module, configured to send advance backup data corresponding to multimedia files to N types of user terminals, where N≥1;

a receiving module, configured to receive a data request that is sent by an (N+1)th type of user terminal and is used for requesting a multimedia file; and an address sending module, configured to send, to the (N+1)th type of user terminal, a link address, of advance backup data corresponding to the multimedia file, in the N types of user terminals, the link address being used for instructing the (N+1)th type of user terminal to acquire, from the N types of user terminals, data corresponding to the multimedia file.

According to a fifth aspect of the present disclosure, a data transmission apparatus is provided, the apparatus including:

a first sending module, configured to send a data request corresponding to a multimedia file to a server;

a first receiving module, configured to receive a link address, sent by the server according to the data request, of advance backup data corresponding to the multimedia file, in N types of user terminals, the advance backup data being backup data that is sent by the server to the N types of user terminals and corresponds to the multimedia file;

a second sending module, configured to send a first data request to the N types of user terminals according to the link address received by the first receiving module; and a second receiving module, configured to receive advance backup data that is sent by the N types of user terminals according to the first data request and corresponds to the multimedia file.

According to a sixth aspect of the present disclosure, a data transmission apparatus is provided, the apparatus including:

a data receiving module, configured to receive advance backup data, sent by a server, corresponding to multimedia files;

a receiving module, configured to receive a first data request, sent by an (N+1)th type of user terminal, for a multimedia file, the first data request being sent by the (N+1)th type of user terminal according to a link address, of advance backup data corresponding to the multimedia file, in N types of user terminals, and the link address being fed back by the server to the (N+1)th type of user terminal after the (N+1)th type of user terminal sends, to the server, a data request for the multimedia file, where N≥1; and a data sending module, configured to send, according to the first data request received by the receiving module, advance backup data corresponding to the multimedia file to the (N+1)th type of user terminal.

According to a seventh aspect of the present disclosure, a network system is provided, the network system including: a server and each type of user terminal, the server being connected to each type of user terminal, where, the server is the data transmission apparatus in the fourth aspect; and each type of user terminal is the data transmission apparatus in the fifth aspect; and/or, each type of user terminal is the data transmission apparatus in the sixth aspect.

The beneficial effects brought by the technical solutions provided in the embodiments of the present invention are as follows. Advance backup data corresponding to multimedia files is sent to N types of user terminals, and when a data request that is sent by an (N+1)th type of user terminal and is used for requesting a multimedia file is received, a link address, of advance backup data corresponding to the multimedia file, in the N types of user terminals is sent to an (N+1)th type of user terminal, so that the (N+1)th type of user terminal acquires, from the N types of user terminals according to the link address, the advance backup data corresponding to the multimedia file, thereby implementing data transmission between user terminals of different types, reducing data transmission pressure of a server and saving network bandwidth resources.

BRIEF DESCRIPTION OF THE DRAWINGS

To describe the technical solutions in the embodiments of the present invention more clearly, drawings required in description of the embodiments will be introduced simply below. It is obvious that the drawings in the following description are only some of the embodiments of the present invention, and a person of ordinary skill in the art may obtain other drawings based on the drawings without creative efforts.

DESCRIPTION OF EMBODIMENTS

To make the objectives, technical solutions, and advantages in the present invention clearer, the following further describes the implementation manners of the present invention in detail with reference to the accompanying drawings.

In the data transmission methods provided in the embodiments of the present invention, a multimedia file at least includes an online video and online music. A video in the online video may be: a movie, a television program, an animation, a music video (MV), a microcinema video, or a video uploaded by a netizen.

Figure 1:
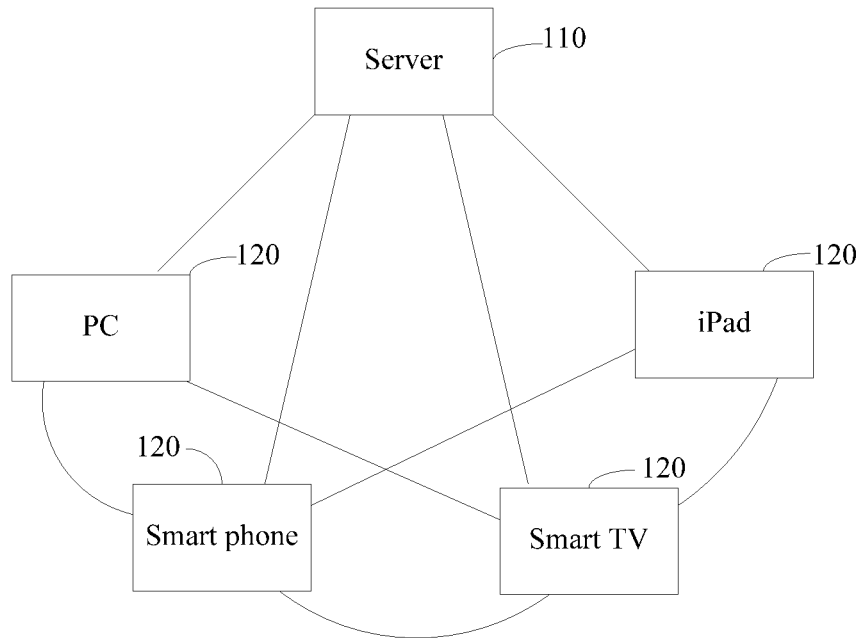
FIG. 1 is a schematic structural diagram of a data transmission system involved in a data transmission method provided in an embodiment of the present invention.

FIG. 1 is a schematic structural diagram of a data transmission system involved in a data transmission method provided in an embodiment of the present invention. The implementation environment includes: a server 110 and each of various types of user terminal 120.

The server 110 may be one server, or a server cluster formed of several servers, or is a cloud computing service center. The server 110 is configured to provide a terminal with a service of transmitting a communication data stream.

Each type of user terminal 120 may be a terminal device of a different type. Each type of user terminal 120 may be a mobile phone, a tablet computer, an e-reader, a Moving Picture Experts Group Audio Layer III (MP3) player, a Moving Picture Experts Group Audio Layer IV (MP4) player, a laptop computer, a desktop computer, a smart TV, and the like.

Each type of user terminal 120 and the server 110 may be connected through a wireless network or a wired network.

Figure 2:
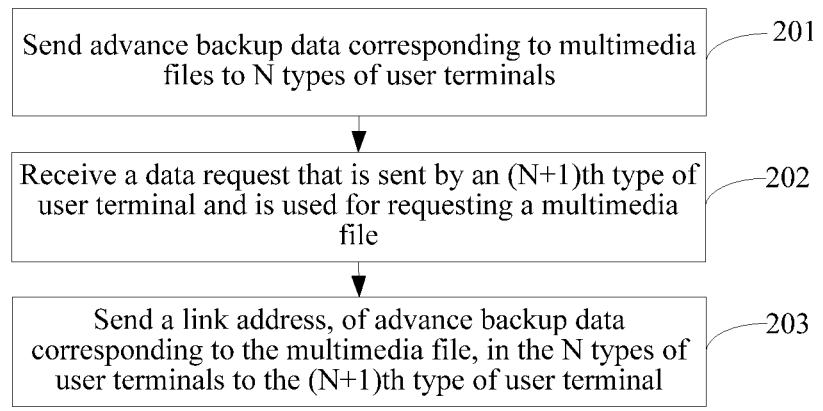
FIG. 2 is a method flowchart of a data transmission method on a server side provided in an embodiment of the present invention.

FIG. 2 is a method flowchart of a data transmission method provided in an embodiment of the present invention. This embodiment is described by using an example in which the data transmission method is applied to the implementation environment shown in FIG. 1. On a server side, the data transmission method includes:

Step 201: Send advance backup data corresponding to multimedia files to N types of user terminals, where N≥1.

Step 202: Receive a data request that is sent by an (N+1)th type of user terminal and is used for requesting a multimedia file.

Step 203: Send a link address, of advance backup data corresponding to the multimedia file, in the N types of user terminals to the (N+1)th type of user terminal.

The link address is used for instructing the (N+1)th type of user terminal to acquire, from the N types of user terminals, data corresponding to the multimedia file.

In the data transmission method provided in this embodiment, advance backup data corresponding to multimedia files is sent to N types of user terminals, and when a data request that is sent by an (N+1)th type of user terminal and is used for requesting a multimedia file is received, a link address, of advance backup data corresponding to the multimedia file, in the N types of user terminals is sent to an (N+1)th type of user terminal, so that the (N+1)th type of user terminal acquires, from the N types of user terminals according to the link address, the advance backup data corresponding to the multimedia file, thereby implementing data transmission between user terminals of different types, reducing data transmission pressure of a server and saving network bandwidth resources.

Figure 3:
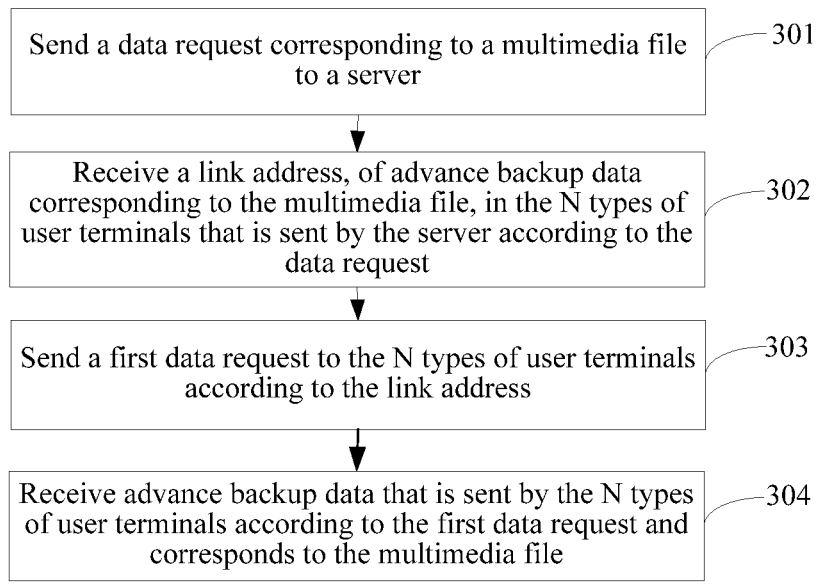
FIG. 3 is a method flowchart of a data transmission method on a side of each type of user terminal provided in an embodiment of the present invention.

FIG. 3 is a method flowchart of a data transmission method provided in an embodiment of the present invention. This embodiment is described by using an example in which the data transmission method is applied to the implementation environment shown in FIG. 1. On a side of each type of user terminal, the data transmission method includes:

Step 301: Send a data request corresponding to a multimedia file to a server.

Step 302: Receive a link address, of advance backup data corresponding to the multimedia file, in the N types of user terminals that is sent by the server according to the data request.

The advance backup data is backup data that is sent by the server to the N types of user terminals and corresponds to the multimedia file.

Step 303: Send a first data request to the N types of user terminals according to the link address.

Step 304: Receive advance backup data that is sent by the N types of user terminals according to the first data request and corresponds to the multimedia file.

In the data transmission method provided in this embodiment, a data request corresponding to a multimedia file is sent to a server, and a link address sent by the server according to the data request is received, so as to send a first data request to N types of user terminals according to the link address, and acquire, from the N types of user terminals, advance backup data corresponding to the multimedia file, thereby implementing data transmission between user terminals of different types, reducing data transmission pressure of a server and saving network bandwidth resources.

Figure 4:
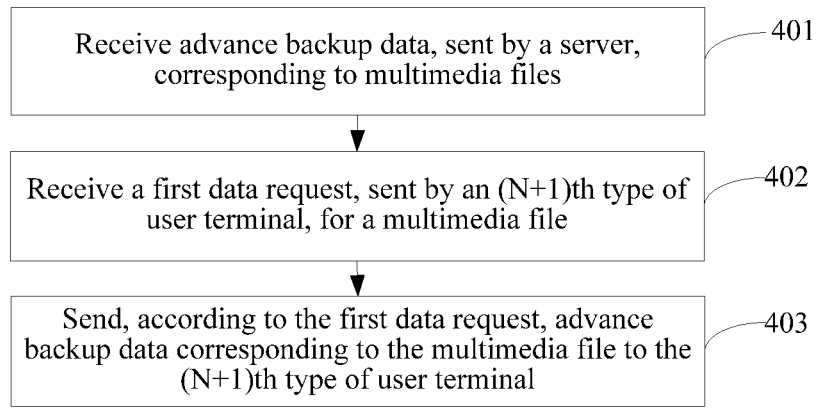
FIG. 4 is a method flowchart of a data transmission method on a side of each type of user terminal provided in another embodiment of the present invention.

FIG. 4 is a method flowchart of a data transmission method provided in another embodiment of the present invention. This embodiment is described by using an example in which the data transmission method is applied to the implementation environment shown in FIG. 1. On a side of each type of user terminal, the data transmission method includes:

Step 401: Receive advance backup data, sent by a server, corresponding to multimedia files.

Step 402: Receive a first data request, sent by an (N+1)th type of user terminal, for a multimedia file.

The first data request is sent by the (N+1)th type of user terminal according to a link address, of advance backup data corresponding to the multimedia file, in the N types of user terminals, and the link address is fed back by the server to the (N+1)th type of user terminal after the (N+1)th type of user terminal sends a data request for the multimedia file to the server, where N≥1.

Step 403: Send, according to the first data request, advance backup data corresponding to the multimedia file to the (N+1)th type of user terminal.

In the data transmission method provided in this embodiment, advance backup data corresponding to each multimedia file sent by a server is received, and when a first data request, sent by an (N+1)th type of user terminal, for a multimedia file is received, advance backup data corresponding to the multimedia file is sent to the (N+1)th type of user terminal according to the first data request, thereby implementing data transmission between user terminals of different types, reducing data transmission pressure of a server and saving network bandwidth resources.

Figure 5:
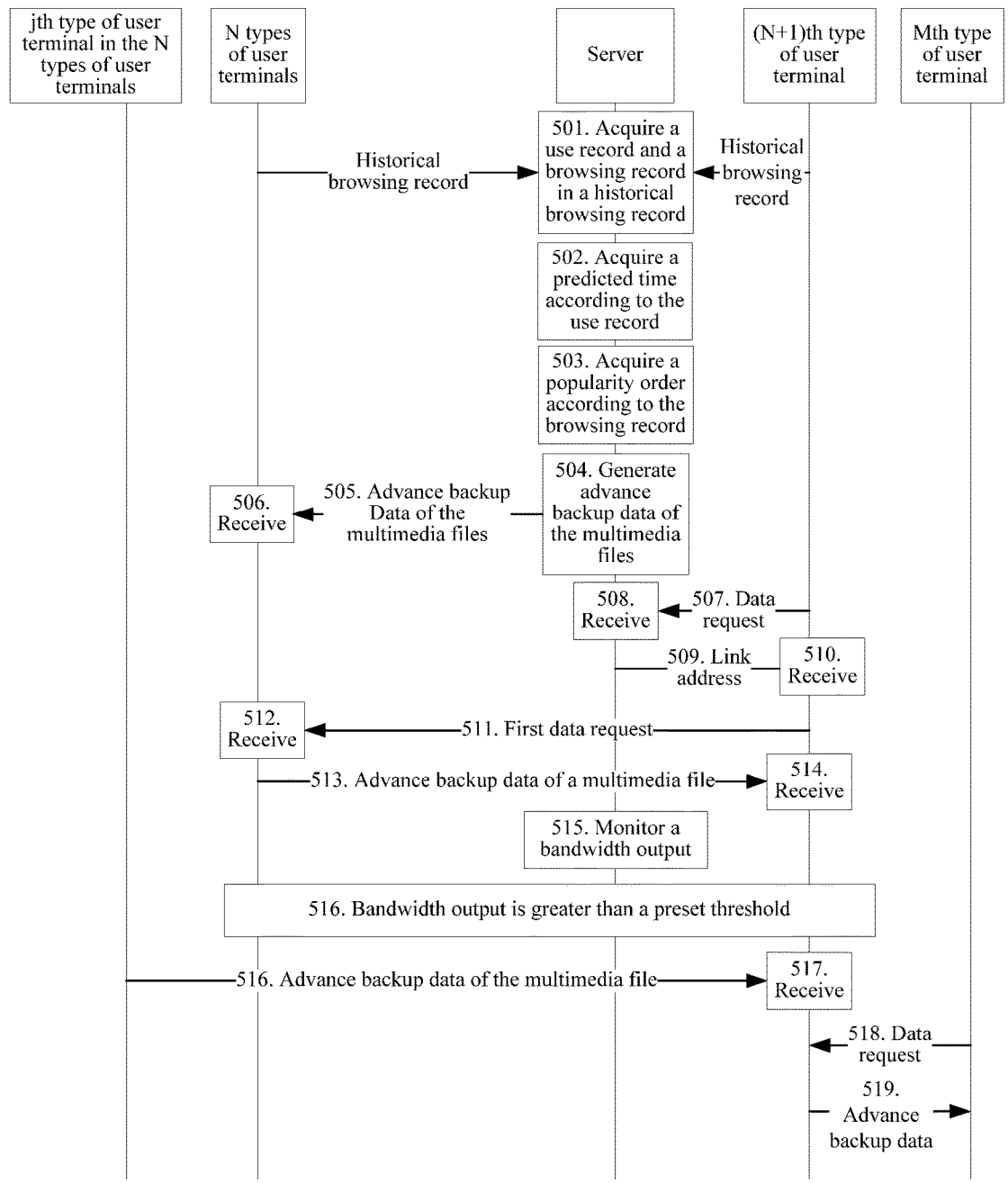
FIG. 5 is a method flowchart of a data transmission method provided in an embodiment of the present invention.

FIG. 5 is a method flowchart of a data transmission method provided in an embodiment of the present invention. As a more preferred embodiment provided based on any of the embodiments shown in FIG. 2 to FIG. 4, this embodiment is described in detail by using a specific implementation manner in which a server performs P2P data transmission for terminals of different types. The data transmission method includes:

Step 501: A server acquires a use record and a browsing record when each user uses a multimedia file according to a historical browsing record of each user.

The use record at least includes: a type of a user terminal playing a multimedia file and a time that the multimedia file is played on each type of user terminal. The browsing record at least includes: the number of times that the multimedia file is played, duration that the multimedia file is played, and a bit rate when the multimedia file is played.

The multimedia file involved in the embodiment of the present invention is described by using an online video as an example. The user terminal herein at least includes: a PC, a tablet computer, a smart phone (for example, a mobile phone using an Android system or a mobile phone using an Apple iOS system), a laptop computer, a smart TV, and a smart router.

For example:

(1) The server acquires the use record when each user uses a multimedia file, so as to obtain:

For a user A: The user A logs in to a user account "userA" by using a smart phone everyday between 12:00 and 13:00 from Monday, Apr. 7 to Friday, Apr. 11, 2014 to watch an animation; and logs in to the user account "userA" by using a PC everyday between 20:00 and 22:00 to watch a movie; and uses the PC everyday between 22:00 and 23:00 to watch an animation.

The terminals used by the user A herein are a PC and a smart phone. The login time is: "everyday between 12:00 and 13:00, everyday between 20:00 and 22:00, and everyday between 22:00 and 23:00 from Monday, Apr. 7 to Friday, Apr. 11, 2014". The types of network services are: an animation and a movie. The login account is: userA.

For a user B: The user B logs in to a user account "userB" by using a smart phone everyday between 12:00 and 13:00 from Monday, Apr. 7 to Friday, Apr. 11, 2014 to watch an animation; logs in to the user account "userB" by using a PC everyday between 20:00 and 22:00 to watch a movie; and logs in to the user account "userB" by using a smart phone everyday between 22:00 and 23:00 to watch a TV series.

The terminals used by the user B herein is: a PC and a smart phone. The login time is: "everyday between 12:00 and 13:00, everyday between 20:00 and 22:00, and everyday between 22:00 and 23:00 from Monday, Apr. 7 to Friday, Apr. 11, 2014". The types of network services are: an animation and a movie. The login account is: userB.

The type of the user terminal in the use record acquired by the server may be determined according to a type of a client when each user logs in to an account.

(2) The server acquires the browsing record when each user uses a multimedia file, so as to obtain:

In a period of time from Monday, Apr. 14 to Friday, Apr. 18, 2014:

For the user A:

A browsing record 1: The user A uses the smart phone to watch the animation Crayon Shin-chan 10 times, duration of using the smart phone to watch each episode of the animation is 25 minutes, and a bit rate corresponding to each episode of Crayon Shin-chan is "bit rate 1".

A browsing record 2: The user A uses the PC to watch the movie The Hobbit II 3 times, duration of using the PC to watch the movie is 120 minutes, and a bit rate corresponding to The Hobbit II is "bit rate 2".

A browsing record 3: The user A uses the PC to watch the TV series A Servant Of Two Masters 10 times, duration of using the PC to watch each episode of the TV series is 45 minutes, and a bit rate corresponding to A Servant Of Two Masters is "bit rate 3".

For the user B:

A browsing record 1: The user B uses the smart phone to watch the animation Crayon Shin-chan 12 times, duration of using the smart phone to watch each episode of the animation is 25 minutes, and a bit rate corresponding to each episode of Crayon Shin-chan is "bit rate 1".

A browsing record 2: The user B uses the PC to watch the movie The Hobbit II 5 times, duration of using the PC to watch the movie is 120 minutes, and a bit rate corresponding to The Hobbit II is "bit rate 2".

A browsing record 3: The user B uses the smart phone to watch the TV series A Servant Of Two Masters 8 times, duration of using the PC to watch each episode of the TV series is 45 minutes, and a bit rate corresponding to A Servant Of Two Masters is "bit rate 4".

In the embodiment of the present invention, the use of a PC and a smart phone to watch an online video is merely used as an example, and an applicable type of user terminal is not specifically limited as long as the data transmission method provided in the embodiment of the present invention is implemented.

Step 502: The server acquires, according to the use record, a predicted time that each user plays the multimedia file by using each type of user terminal.

That the server acquires, according to the use record, a predicted time that each user plays the multimedia file by using each type of user terminal includes:

performing, by the server, clustering according to types of multimedia files played by using each type of user terminal, to obtain the predicted time that each user plays the multimedia file by using each type of user terminal.

That the server performs clustering according to types of multimedia files played by using each type of user terminal, to obtain the predicted time that each user plays the multimedia file by using each type of user terminal includes:

a. The server performs clustering, for each user, according to a k-means clustering algorithm and a time sequence that a user plays the multimedia file by using each type of user terminal, on types of multimedia files played by the user by using each type of user terminal, to obtain the predicted time that the user plays the multimedia file by using each type of user terminal.

The time sequence is a discrete sequence formed by sampling time points, when the user plays the multimedia file by using each type of user terminal, within a sampling period.

For example:

The k-means clustering algorithm is: Accept a parameter k; and then categorize n data objects input in advance into k clusters to make the obtained clusters meet that: Objects in a same cluster have a relatively high similarity; and objects in different clusters have a low similarity.

Specifically, the use record in step 501 is used as an example, and the server acquires the predicted time of the user A and the user B by using the k-means clustering algorithm:

The time sequence is: a discrete sequence of types of online videos that the user A and the user B watch by using different terminals everyday "between 12:00 and 13:00", "between 20:00 and 22:00", and "between 22:00 and 23:00" within the period of time from Monday, Apr. 7 to Friday, Apr. 11, 2014.

The predicted time that the user A plays an online video by using each type of user terminal is obtained according to the use record of the user A, as shown in Table 1:

TABLE 1

| Time | Terminal | User Account | Network Service |
|---|---|---|---|
| Between 12:00 and 13:00 | Smart phone | UserA | Animation |
| Between 20:00 and 22:00 | PC | UserA | Movie |
| Between 22:00 and 23:00 | PC | UserA | Animation |

Here, as shown in Table 1, the predicted time obtained by using the k-means clustering algorithm may be represented as that: The user A logs in to the account "userA" by using a smart phone everyday between 12:00 and 13:00 to watch an animation; the user A logs in to the account "userA" by using a PC everyday between 20:00 and 22:00 to watch a movie; and the user A logs in to the account "userA" by using a PC everyday between 22:00 and 23:00 to watch an animation.

The predicted time that the user B plays an online video by using each type of user terminal is obtained according to the use record of the user B, as shown in Table 2:

TABLE 2

| Time | Terminal | User Account | Network Service |
|---|---|---|---|
| Between 12:00 and 13:00 | Smart Phone | UserB | Animation |
| Between 20:00 and 22:00 | PC | UserB | Movie |
| Between 22:00 and 23:00 | Smart Phone | UserB | TV series |

Here, as shown in Table 2, the predicted time obtained by using the k-means clustering algorithm may be represented as that: The user B logs in to the account "userB" by using a smart phone everyday between 12:00 and 13:00 to watch an animation; the user B logs in to the account "userB" by using a PC everyday between 20:00 and 22:00 to watch a movie; and the user B logs in to the account "userB" by using a smart phone everyday between 22:00 and 23:00 to watch a TV series.

The server acquires, by using a client with which the user logs in to the user account, the terminal type used by the user.

Three clusters a, b, and c may be categorized according to the types of online videos according to Table 1 and Table 2:

Cluster a: The user A logs in to the user account "userA" by using a smart phone everyday between 12:00 and 13:00 to watch an animation; or, the user A logs in to the user account "userA" by using a PC everyday between 22:00 and 23:00 to watch an animation; and the user B logs in to the user account "userB" by using a smart phone everyday between 12:00 and 13:00 to watch an animation.

Cluster b: The user A logs in to the user account "userA" by using a PC everyday between 20:00 and 22:00 to watch a movie; and the user B logs in to the user account "userB" by using a PC everyday between 20:00 and 22:00 to watch a movie.

Cluster c: The user B logs in to the user account "userB" by using a smart phone everyday between 22:00 and 23:00 to watch a TV series.

b. The server performs sampling again on use record when the user plays the multimedia file by using each type of user terminal.

During re-sampling, a sampling period and sampling time points same as those in the time sequence are used.

It is assumed here that during sampling again, the sampling period is 5 consecutive working days, and the sampling time points are still everyday "between 12:00 and 13:00", "between 20:00 and 22:00", and "between 22:00 and 23:00". That is, the use record of use of 5 working days, "Monday, Apr. 14 to Friday, Apr. 18, 2014", is acquired.

Here, the user A only changes to watch an online video "TV series" in a period of everyday between 22:00 and 23:00 in "Monday, Apr. 14 to Friday, Apr. 18, 2014".

c. The server calibrates, according to the use record of the user obtained through sampling again, predicted time, to obtain the calibrated predicted time.

Here, if the network service corresponding to everyday between 22:00 and 23:00 in the use record of the user within the time "Monday, Apr. 14 to Friday, Apr. 18, 2014" is "TV series", the type of the multimedia file corresponding to predicted time between 22:00 and 23:00 shown in Table 1 is changed to "TV series", and the changed clusters are:

Cluster a: The user A logs in to the user account "userA" by using a smart phone everyday between 12:00 and 13:00 to watch an animation; and the user B logs in to the user account "userB" by using a smart phone everyday between 12:00 and 13:00 to watch an animation.

Cluster b: The user A logs in to the user account "userA" by using a PC everyday between 20:00 and 22:00 to watch a movie; and the user B logs in to the user account "userB" by using a PC everyday between 20:00 and 22:00 to watch a movie.

Cluster c: The user A logs in to the user account "userA" by using a PC everyday between 22:00 and 23:00 to watch a TV series; and the user B logs in to the user account "userB" by using a smart phone everyday between 22:00 and 23:00 to watch a TV series.

Step 503: The server acquires a popularity order of multimedia files according to the browsing record.

That the server acquires a popularity order of multimedia files according to the browsing record includes:

The server performs clustering according to the number of times that each user plays the multimedia files by using each type of user terminal, to obtain the popularity order of the multimedia files.

That the server performs clustering according to the number of times that each user plays the multimedia files by using each type of user terminal, to obtain the popularity order of the multimedia files includes:

a. The server selects, from the browsing records, a browsing record whose duration that the multimedia file is played is greater than a preset threshold as a valid browsing record.

Here the server selects, from the browsing records of the user A and the user B by setting a threshold, a browsing record whose duration that the multimedia file is played is greater than the preset threshold as a valid browsing record, so that if an online video that is only watched for 1 minute exists in the browsing record of the user A and the user B, the online video is filtered, because the online video does not reflect watching interest of the user A or the user B during watching of an online video.

b. The server obtains, according to the valid browsing record, the valid number of times that the multimedia file is played.

c. The server performs, for each user, according to a k-means clustering algorithm and a time sequence that a user plays the multimedia file by using each type of user terminal, clustering on the valid number of times that the user plays the multimedia file by using each type of user terminal, to obtain the popularity order of the multimedia files.

The time sequence is a discrete sequence formed by sampling time points, when the user plays the multimedia file by using each type of user terminal, within a sampling period.

Clustering is performed according to the browsing record in step 501. Here, according to the browsing records in step 501 that: in the browsing records of the user A and the user B, the user A and the user B together watch the animation Crayon Shin-chan 22 times by using a smart phone; the user A and the user B together watch the movie The Hobbit II 8 times by using a PC; and the user A and the user B together watch the TV series A Servant Of Two Masters 10 times by using a PC, the popularity order, of the multimedia files in each type of user terminal, obtained by the server is as follows:

a. when the user terminal is a smart phone, the popular video is the animation Crayon Shin-chan.

b. when the user terminal is a PC, the popular video is the movie The Hobbit II; and c. when the user terminal is a PC, the popular video is the TV series A Servant Of Two Masters.

In an actual implementation process, the popularity order of multiple multimedia files in each type of user terminal may be obtained according to the browsing records of multiple users. That is, for each type of user terminal, an order of multiple multimedia files is generated. For example, in the time sequence, by using a smart phone, the user A has watched the animation Crayon Shin-chan 10 times, Zombie Brother 5 times, and Blade & Soul 6 times; in the time sequence, by using a smart phone, the user B has watched the animation Crayon Shin-chan 12 times, Zombie Brother 7 times, and Blade & Soul 4 times; and in the time sequence, by using a smart phone, a user C has watched the animation Crayon Shin-chan 9 times, Zombie Brother 5 times, and Blade & Soul 6 times. It is obtained through counting that the top 2 animations that have been watched mostly on a smart phone end are Crayon Shin-chan (31 times) and Zombie Brother (17 times). Similarly, for a PC end, if user terminals such as a tablet computer and a notebook computer also exist, a popularity order of multiple multimedia files in each type of user terminal may also be obtained through counting. The embodiment of the present invention is described only by using the foregoing as an example, and the number of multimedia files in the popularity order is not specifically limited, as long as a data transmission method is implemented.

Step 504: The server generates, according to the predicted time for each type of user terminal, advance backup data of the multimedia files in the popularity order.

That the server generates, according to the predicted time for each type of user terminal, advance backup data of the multimedia files in the popularity order includes:

a. The server performs mapping on the predicted time when the multimedia file is played by using each type of user terminal and the popularity order of the multimedia files, to obtain a correspondence between a multimedia file and a user terminal.

Mapping is performed according to the predicted time in step 502 and the popularity order in step 503, so that a correspondence between a multimedia file and a user terminal is obtained as follows:

(1) The user A and the user B log in to user accounts "userA" and "userB" respectively by using smart phones, to watch the animation Crayon Shin-chan everyday between 12:00 and 13:00.

(2) The user A and the user B log in to user accounts "userA" and "userB" respectively by using PCs, to watch the movie The Hobbit II everyday between 20:00 and 22:00.

(3) The user A logs in to the user account "userA" by using a PC, to watch the TV series A Servant Of Two Masters everyday between 22:00 and 23:00; and the user B logs in to the user account "userB" by using a smart phone, to watch the TV series A Servant Of Two Masters everyday between 22:00 and 23:00.

Here, in the foregoing relationship, "everyday between 12:00 and 13:00" may be considered as a peak period of time in a process of using a network service by using a smart phone, and "everyday between 20:00 and 22:00" and "everyday between 22:00 and 23:00" may be considered as peak periods of time in a process of using a network service by using a PC.

b. The server generates, for each type of user terminal according to the correspondence between a multimedia file and a user terminal, advance backup data of the multimedia files in the popularity order.

According to the relationship in step a, the server may generate, according to the foregoing relationship, advance backup data of the animation Crayon Shin-chan for a smart phone end; and generates advance backup data of the movie The Hobbit II and the TV series A Servant Of Two Masters for a PC end.

Moreover, according to the relationship in step a, during data transmission, the server may preferentially transmit backup data of a corresponding animation, movie, and TV series to the smart phones or PCs used by the user A and the user B, so that when another user requests data of the animation, movie or TV series from the server, data corresponding to each network service is acquired by using link addresses corresponding to the advance backup data of the user A and the user B.

Step 505: The server sends the advance backup data corresponding to the multimedia files to N types of user terminals, where N≥1.

That the server sends the advance backup data corresponding to the multimedia files to N types of user terminals includes that:

a. The server determines N types of user terminals according to the types of user terminals corresponding to each multimedia file in the predicted time.

The server uses, according to the content in step 504, a PC that is used to watch a movie online within a predicted time between 20:00 and 22:00 as a user terminal corresponding to the movie The Hobbit II; and uses a smart phone that is used to watch an animation online within a predicted time between 12:00 and 13:00 as a terminal corresponding to the animation Crayon Shin-chan. According to the TV series in step 504, a smart phone and a PC may be separately used as user terminals corresponding to the TV series A Servant Of Two Masters.

b. The server sends advance backup data corresponding to each network service to the first user terminal.

According to step a, advance backup data corresponding to an animation is sent to a smart phone, advance backup data corresponding to a movie is sent to a PC, and advance backup data corresponding to a TV series is sent to a smart phone and a PC. Therefore, when another type of user terminal sends a data request for a movie or TV series to a server, the server sends a link address corresponding to the animation, movie or TV series to the another type of user terminal. Alternatively, a seed file corresponding to the animation, movie or TV series may be sent to the another type of user terminal.

Step 506: The N types of user terminals receive the advance backup data sent by the server.

Step 507. An (N+1)th type of user terminal sends a data request corresponding to a multimedia file to a server.

Step 508: The server receives the data request that is sent by the (N+1)th type of user terminal and is used for requesting the multimedia file.

Step 509: The server sends a link address, of advance backup data corresponding to the multimedia file, in the N types of user terminals to the (N+1)th type of user terminal.

The link address is used for instructing the (N+1)th type of user terminal to acquire, from the N types of user terminals, data corresponding to the multimedia file.

Step 510: The (N+1)th type of user terminal receives the link address, of the advance backup data corresponding to the multimedia file, in the N types of user terminals that is sent by the server according to the data request.

Step 511: The (N+1)th type of user terminal sends a first data request to the N types of user terminals according to the link address.

Step 512: The N types of user terminals receive a first data request, sent by an (N+1)th type of user terminal, for a multimedia file.

Step 513: The N types of user terminal sends, according to the first data request, the advance backup data corresponding to the multimedia file to the (N+1)th type of user terminal.

Step 514: The (N+1)th type of user terminal receives the advance backup data that is sent by the N types of user terminals according to the first data request and corresponds to the multimedia file.

The method from step 506 to step 514 here is described by using a specific example:

When a smart phone requests a resource of the movie The Hobbit II from a server (that is, within a peak period of time of use of a smart phone), the server sends a link address of the movie The Hobbit II on a PC end to the smart phone, so that the smart phone sends, to the PC according to the link address, a first data request of acquiring advance backup data corresponding to the movie The Hobbit II, and acquires, according to the first data request, the advance backup data that is sent by the PC and corresponds to the movie The Hobbit II. The method in step 506 may be understood as that before a peak period of time of use of a smart phone comes, the server sends the advance backup data of the movie The Hobbit II to the PC, so that when the peak period of time of use of a smart phone comes, the smart phone sends the first data request to the PC, so as to further acquire the advance backup data of the movie The Hobbit II.

Optionally, in step 515, the server monitors a bandwidth output of each type of user terminal according to a preset threshold.

Step 516: When a bandwidth output by an ith type of user terminal in the N types of user terminals to an (N+1)th type of user terminal is greater than a preset threshold, the server reduces a bandwidth output of the ith type of user terminal, and adds advance backup data of a multimedia file sent by a jth type of user terminal in the N types of user terminals to the (N+1)th type of user terminal, where 0≤i, j≤N.

Step 517: The (N+1)th type of user terminal receives the advance backup data, of the multimedia file, sent by the jth type of user terminal in the N types.

Step 515 to step 517 here ensure that when the N types of user terminals transmit data to the (N+1)th type of user terminal, the bandwidth output does not increase to cause corresponding consumption of expenditure.

Step 518: The (N+1)th type of user terminal receives a data request from an Mth type of user terminal for the multimedia file.

Step 519: The (N+1)th type of user terminal sends, according to the data request, data corresponding to the multimedia file to the Mth type of user terminal, where N+1≤M.

Specifically, after the smart phone acquires the advance backup data of the movie The Hobbit II, if the PC is in a peak period of time of use, another user terminal may send a data request to the smart phone, to acquire the advance backup data of the movie The Hobbit II. Here, the smart phone not only can perform P2P data sharing on terminals of a same type, but also can further provide another type of user terminal with data sharing.

Optionally, the use record in step 501 further includes:

a time that each user logs in to a corresponding client by using each type of user terminal, and an upload rate and a download rate of a network where each type of user terminal, used by the user on each sampling time point within the sampling period, is located.

The server may set, according to the use record of the upload rate and the download rate of the network where each type of user terminal is located, a threshold used for regulating a bandwidth output of each type of user terminal, and determine, according to the upload rate and download rate of the network where each type of user terminal is located, whether each type of user terminal has a capability of transmitting advance backup data of a multimedia file to a user terminal requesting a multimedia file.

In addition, a time that each user logs in to a corresponding client by using each type of user terminal is used so that, if a multimedia file is not played after the user logs in to a corresponding client by using the user terminal, the server may regulate, according to the time that the user terminal does not play the multimedia file, the user terminal to upload the advance backup data corresponding to the multimedia file.

The data transmission method provided in this embodiment implements data transmission between user terminals of different types, reduces data transmission pressure of a server and saves network bandwidth resources. In another aspect, k-means cluster computation is performed by using a use record acquired from a historical browsing record of each user to obtain a predicted time that a multimedia file is played by using each type of terminal, that is, a server end can acquire, according to the predicted time, a bandwidth use peak time corresponding to each type of terminal, so as to avoid that when a bandwidth peak period comes, each type of user terminal cannot acquire, in a P2P transmission manner, advance backup data corresponding to a needed multimedia file; in still another aspect, k-means cluster computation is performed by using a browsing record acquired from a historical browsing record of each user to obtain a popularity order of multimedia files played by using each type of terminal, so that in combination with a predicted time obtained from a use record, the quantity of advance backup data corresponding to multimedia files sent by a server to each type of user terminal is reduced, and because advance backup data of multimedia files is sent to each type of user terminal according to the popularity order, watching interest of a user can be better met; and in yet another aspect, a server detects a bandwidth of each type of user terminal, thereby preventing an excessively large bandwidth output from causing an increase in cost.

Figure 6:
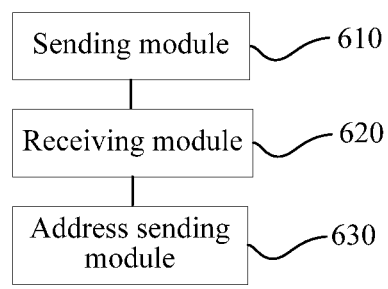
FIG. 6 is a structural block diagram of a data transmission apparatus on a server side provided in an embodiment of the present invention.

FIG. 6 is a structural block diagram of a data transmission apparatus provided in an embodiment of the present invention. The data transmission apparatus is used on a server side, and the data transmission apparatus includes: a sending module 610, a receiving module 620, and an address sending module 630.

The sending module 610 is configured to send advance backup data corresponding to multimedia files to N types of user terminals, where N≥1.

The receiving module 620 is configured to receive a data request that is sent by an (N+1)th type of user terminal and is used for requesting a multimedia file.

The address sending module 630 is configured to send a link address, of advance backup data corresponding to the multimedia file, in the N types of user terminals to the (N+1)th type of user terminal, where the link address is used for instructing the (N+1)th type of user terminal to acquire, from the N types of user terminals, data corresponding to the multimedia file.

In conclusion, in the data transmission apparatus provided in this embodiment, advance backup data corresponding to multimedia files is sent to N types of user terminals, and when a data request that is sent by an (N+1)th type of user terminal and is used for requesting a multimedia file is received, a link address, of advance backup data corresponding to the multimedia file, in the N types of user terminals is sent to an (N+1)th type of user terminal, so that the (N+1)th type of user terminal acquires, from the N types of user terminals according to the link address, the advance backup data corresponding to the multimedia file, thereby implementing data transmission between user terminals of different types, reducing data transmission pressure of a server and saving network bandwidth resources.

Figure 7:
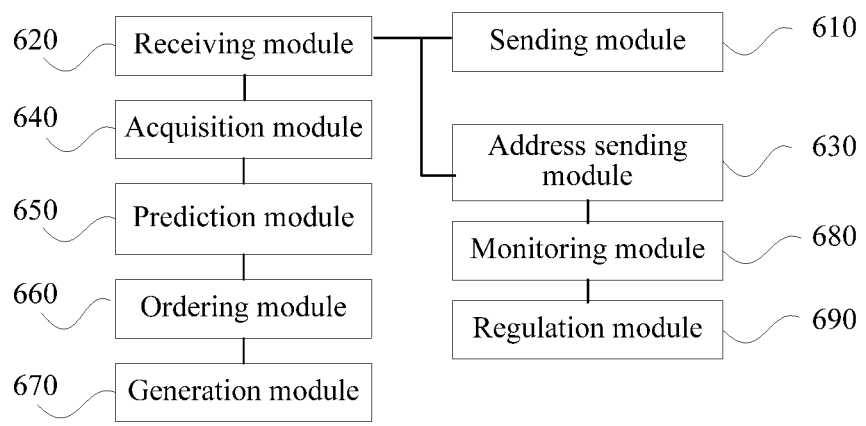
FIG. 7 is a structural block diagram of another data transmission apparatus provided in an embodiment of the present invention.

FIG. 7 is a structural block diagram of another data transmission apparatus provided in an embodiment of the present invention. The data transmission apparatus is used on a server side, and the data transmission apparatus includes: a sending module 610, a receiving module 620, an address sending module 630, an acquisition module 640, a prediction module 650, an ordering module 660, a generation module 670, a monitoring module 680, and a regulation module 690.

The sending module 610 is configured to send advance backup data corresponding to multimedia files to N types of user terminals, where N≥1.

The receiving module 620 is configured to receive a data request that is sent by an (N+1)th type of user terminal and is used for requesting a multimedia file.

The address sending module 630 is configured to send a link address, of advance backup data corresponding to the multimedia file, in the N types of user terminals to the (N+1)th type of user terminal, where the link address is used for instructing the (N+1)th type of user terminal to acquire, from the N types of user terminals, data corresponding to the multimedia file.

Figure 8:
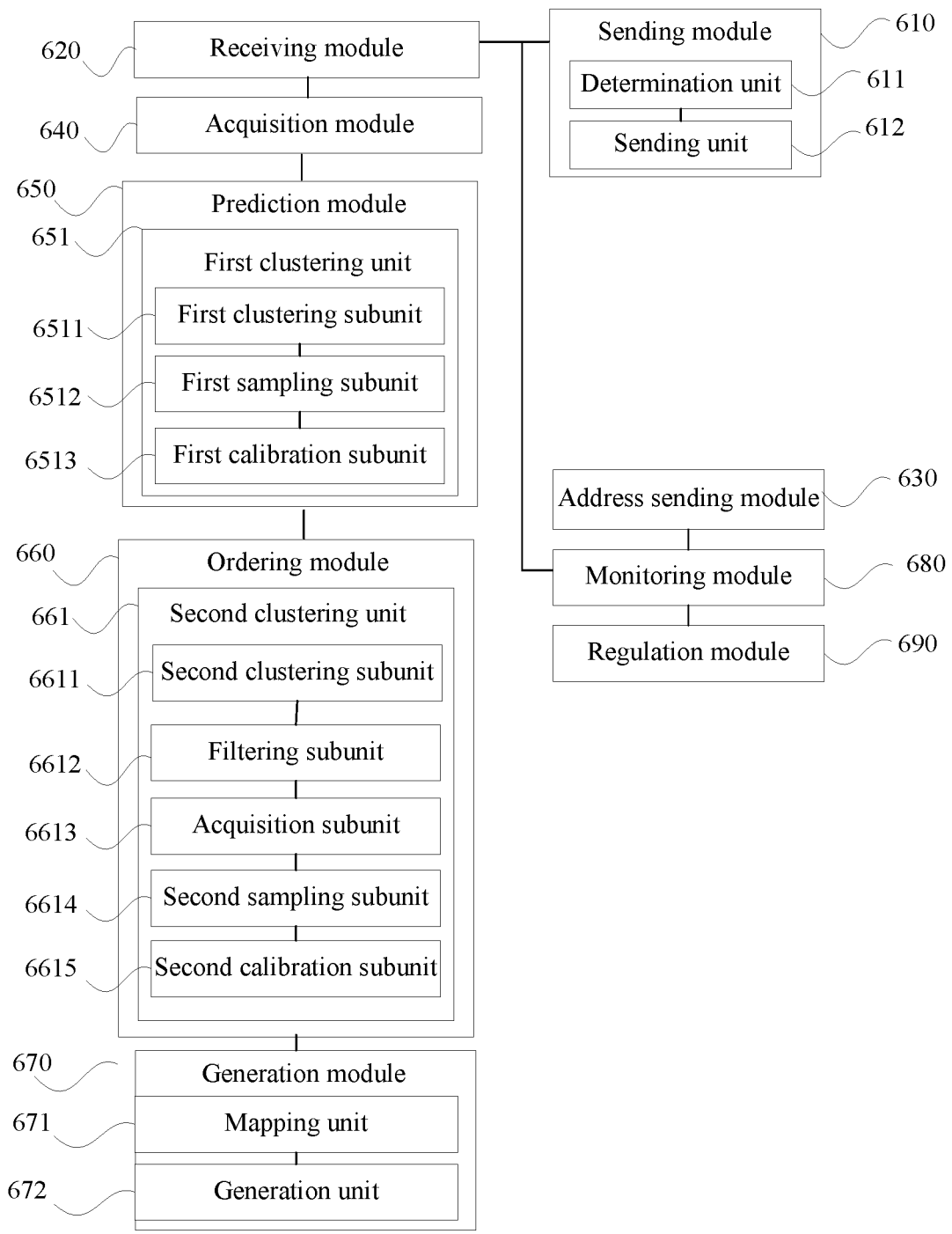
FIG. 8 is a structural block diagram of still another data transmission apparatus provided in an embodiment of the present invention.

Optionally, referring to FIG. 8, the data transmission apparatus further includes:

the acquisition module 640, configured to: before the advance backup data corresponding to the multimedia files is sent to the N types of user terminals, acquire a use record and a browsing record when each user uses a multimedia file according to a historical browsing record of each user, where the use record at least includes: a type of a user terminal playing a multimedia file and a time that the multimedia file is played on each type of user terminal; and the browsing record at least includes: the number of times that the multimedia file is played, duration that the multimedia file is played, and a bit rate when the multimedia file is played;

the prediction module 650, configured to acquire, according to the use record acquired by the acquisition module 640, the predicted time that each user plays the multimedia file by using each type of user terminal;

the ordering module 660, configured to acquire a popularity order of multimedia files according to the browsing record acquired by the acquisition module 640; and the generation module 670, configured to generate, according to the predicted time, for each type of user terminal, acquired by the prediction module 650, advance backup data of the multimedia files in the popularity order acquired by the ordering module 660.

Furthermore, the prediction module 650 includes:

a first clustering unit 651, configured to perform clustering according to types of the multimedia files played by using each type of user terminal, to obtain the predicted time that each user plays the multimedia file by using each type of user terminal.

Furthermore, the first clustering unit 651 includes:

a first clustering subunit 6511, configured to perform clustering, for each user, according to a k-means clustering algorithm and a time sequence that a user plays the multimedia file by using each type of user terminal, on types of multimedia files played by the user by using each type of user terminal, to obtain the predicted time that the user plays the multimedia file by using each type of user terminal, where the time sequence is a discrete sequence formed by sampling time points, when the user plays the multimedia file by using each type of user terminal, within a sampling period.

Optionally, the first clustering unit 651 further includes:

a first sampling subunit 6512, configured to: after the predicted time that the user plays the multimedia file by using each type of user terminal is obtained, perform sampling again on the use record when the user plays the multimedia file by using each type of user terminal, and during sampling again, use a sampling period and sampling time points same as those in the time sequence; and a first calibration subunit 6513, configured to calibrate, according to the use record of the user obtained by the first sampling unit 6512 through sampling again, predicted time, to obtain the calibrated predicted time.

Optionally, the ordering module 660 includes:

a second clustering unit 661, configured to perform clustering according to the number of times that each user plays the multimedia files by using each type of user terminal, to obtain the popularity order of the multimedia files.

Furthermore, the second clustering unit 661 includes:

a second clustering subunit 6611, configured to perform clustering, for each user, according to a k-means clustering algorithm and a time sequence that a user plays the multimedia file by using each type of user terminal, the valid number of times that the user plays the multimedia file by using each type of user terminal, to obtain the popularity order of the multimedia files, where the time sequence is a discrete sequence formed by sampling time points, when the user plays the multimedia file by using each type of user terminal, within a sampling period.

Optionally, the second clustering unit 661 further includes:

a filtering subunit 6612, configured to: before clustering is performed on the valid number of times that the user plays the multimedia file by using each type of user terminal according to the k-means clustering algorithm and the time sequence that a user plays the multimedia file by using each type of user terminal, select, from the browsing records, a browsing record whose duration that the multimedia file is played is greater than a preset threshold as a valid browsing record; and an acquisition subunit 6613, configured to obtain, according to the valid browsing record obtained by the filtering subunit 6612, the valid number of times that the multimedia file is played.

Optionally, the second clustering unit 661 further includes:

a second sampling subunit 6614, configured to: after the popularity order of the multimedia files is obtained, perform sampling again on the browsing records when the user plays the multimedia files by using each type of user terminal, and during sampling again, use a sampling period and sampling time points same as those in the time sequence; and a second calibration subunit 6615, configured to calibrate the popularity order according to the browsing record, of the user, collected by the second sampling subunit 6614 through sampling again, to obtain the calibrated popularity order.

Optionally, the generation module 670 includes:

a mapping unit 671, configured to perform mapping on the predicted time when the multimedia file is played by using each type of user terminal and the popularity order of the multimedia files, to obtain a correspondence between a multimedia file and a user terminal; and a generation unit 672, configured to generate, according to the correspondence between a multimedia file and a user terminal obtained by the mapping unit 671, for each type of user terminal, advance backup data of the multimedia files in the popularity order.

Optionally, the sending module 610 includes:

a determination unit 611, configured to determine the N types of user terminals according to a type of a user terminal corresponding to each multimedia file in the predicted time; and a sending unit 612, configured to send the advance backup data corresponding to multimedia files to the N types of user terminals determined by the determination unit 611.

Optionally, the data transmission apparatus further includes:

a monitoring module 680, configured to: after the link address, of advance backup data corresponding to the multimedia file, in the N types of user terminals is sent to the (N+1)th type of user terminal, monitor a bandwidth output of each type of user terminal according to a preset threshold; and a regulation module 690, configured to: when a bandwidth output by an ith type of user terminal in the N types of user terminals to the (N+1)th type of user terminal is greater than the preset threshold, reduce a bandwidth output of the ith type of user terminal, and add advance backup data of the multimedia file sent by a jth type of user terminal in the N types of user terminals to the (N+1)th type of user terminal, where $0 \leq i, j \leq N$.

The data transmission apparatus provided in this embodiment reduces data transmission pressure of a server and saves network bandwidth resources. In another aspect, k-means cluster computation is performed by using a use record acquired from a historical browsing record of each user to obtain a predicted time that a multimedia file is played by using each type of terminal, that is, a server end can acquire, according to the predicted time, a bandwidth use peak time corresponding to each type of terminal, so as to avoid that when a bandwidth peak period comes, each type of user terminal cannot acquire, in a P2P transmission manner, advance backup data corresponding to a needed multimedia file; in still another aspect, k-means cluster computation is performed by using a browsing record acquired from a historical browsing record of each user to obtain a popularity order of multimedia files played by using each type of terminal, so that in combination with a predicted time obtained from a use record, the quantity of advance backup data corresponding to multimedia files sent by a server to each type of user terminal is reduced, and because advance backup data of multimedia files is sent to each type of user terminal according to the popularity order, watching interest of a user can be better met; and in yet another aspect, a server detects a bandwidth of each type of user terminal, thereby preventing an excessively large bandwidth output from causing an increase in cost.

Figure 9:
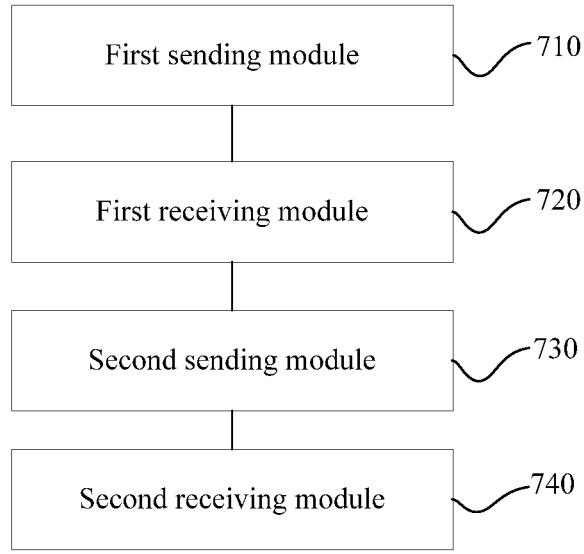
FIG. 9 is a structural block diagram of a data transmission apparatus on a side of each type of user terminal provided in another embodiment of the present invention.

FIG. 9 is a structural block diagram of a data transmission apparatus provided in another embodiment of the present invention. The data transmission apparatus is used on a side of a user terminal, and the data transmission apparatus includes: a first sending module 710, a first receiving module 720, a second sending module 730, and a second receiving module 740.

The first sending module 710 is configured to send a data request corresponding to a multimedia file to a server.

The first receiving module 720 is configured to receive a link address, of advance backup data corresponding to the multimedia file, in the N types of user terminals that is sent by the server according to the data request, where the advance backup data is backup data that is sent by the server to the N types of user terminals and corresponds to the multimedia file.

The second sending module 730 is configured to send a first data request to the N types of user terminals according to the link address received by the first receiving module 720.

The second receiving module 740 is configured to receive advance backup data that is sent by the N types of user terminals according to the first data request and corresponds to the multimedia file.

In the data transmission apparatus provided in this embodiment, a data request corresponding to a multimedia file is sent to a server, and a link address sent by the server according to the data request is received, so as to send a first data request to N types of user terminals according to the link address, and acquire, from the N types of user terminals, advance backup data corresponding to the multimedia file, thereby implementing data transmission between user terminals of different types, reducing data transmission pressure of a server and saving network bandwidth resources.

Figure 10:
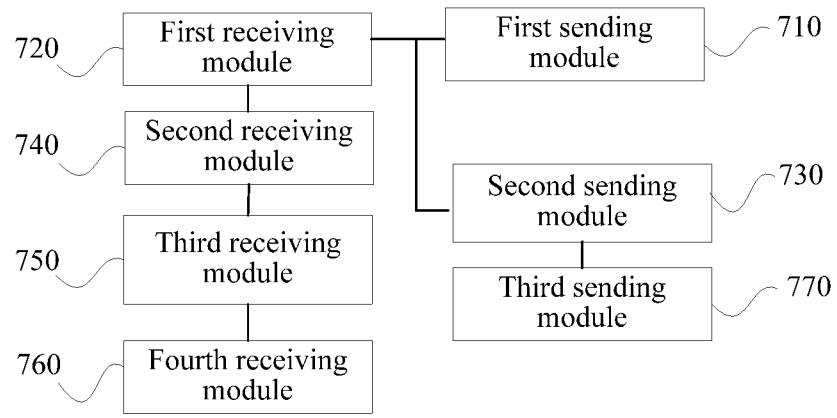
FIG. 10 is a structural block diagram of another data transmission apparatus provided in another embodiment of the present invention.

FIG. 10 is a structural block diagram of another data transmission apparatus provided in another embodiment of the present invention. The data transmission apparatus is used on a side of a user terminal, and the data transmission apparatus includes: a first sending module 710, a first receiving module 720, a second sending module 730, a second receiving module 740, a third receiving module 750, a fourth receiving module 760, and a third sending module 770.

The first sending module 710 is configured to send a data request corresponding to a multimedia file to a server.

The first receiving module 720 is configured to receive a link address, of advance backup data corresponding to the multimedia file, in the N types of user terminals that is sent by the server according to the data request, where the advance backup data is backup data that is sent by the server to the N types of user terminals and corresponds to the multimedia file.

The second sending module 730 is configured to send a first data request to the N types of user terminals according to the link address received by the first receiving module 720.

The second receiving module 740 is configured to receive advance backup data that is sent by the N types of user terminals according to the first data request and corresponds to the multimedia file.

Optionally, the data transmission apparatus further includes:

the third receiving module 750, configured to: after the advance backup data that is sent by the N types of user terminals according to the first data request and corresponds to the multimedia file is received, when a bandwidth output by an ith type of user terminal in the N types to an (N+1)th type of user terminal is greater than a preset threshold, receive backup data, of the multimedia file, sent by a jth type of user terminal in the N types, where $0 \leq i, j \leq N$.

Optionally, the data transmission apparatus further includes:

the fourth receiving module 760, configured to: after the advance backup data that is sent by the N types of user terminals according to the first data request and corresponds to the multimedia file is received, receive a data request from an Mth type of user terminal for the multimedia file; and the third sending module 770, configured to send, according to the data request received by the fourth receiving module 760, data corresponding to the multimedia file to the Mth type of user terminal, where $N+1 \leq M$.

In conclusion, the data transmission apparatus provided in this embodiment implements data transmission between user terminals of different types, reduces data transmission pressure of a server and saves network bandwidth resources. In another aspect, it is avoided that when a bandwidth peak period comes, each type of user terminal cannot acquire, in a P2P transmission manner, advance backup data corresponding to a needed multimedia file.

Figure 11:
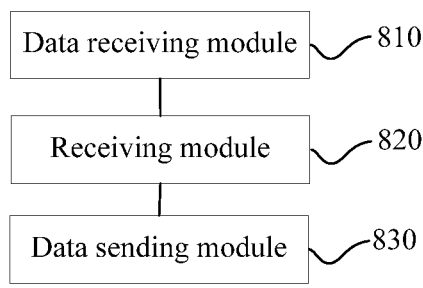
FIG. 11 is a structural block diagram of a data transmission apparatus provided in still another embodiment of the present invention.

FIG. 11 is a structural block diagram of a data transmission apparatus provided in still another embodiment of the present invention. The data transmission apparatus is used on a side of a user terminal, and the data transmission apparatus includes: a data receiving module 810, a receiving module 820, and a data sending module 830.

The data receiving module 810 is configured to receive advance backup data, sent by a server, corresponding to multimedia files.

The receiving module 820 is configured to receive a first data request, sent by an (N+1)th type of user terminal, for a multimedia file, where the first data request is sent by the (N+1)th type of user terminal according to a link address, of advance backup data corresponding to the multimedia file, in N types of user terminals, and the link address is fed back by the server to the (N+1)th type of user terminal after the (N+1)th type of user terminal sends a data request for the multimedia file to the server, where N≥1.

The data sending module 830 is configured to send, according to the first data request received by the receiving module 820, advance backup data corresponding to the multimedia file to the (N+1)th type of user terminal.

In the data transmission apparatus provided in this embodiment, advance backup data that is sent by a server and corresponds to each multimedia file is received, and when a first data request, sent by an (N+1)th type of user terminal, for a multimedia file is received, the advance backup data corresponding to the multimedia file is sent to the (N+1)th type of user terminal according to the first data request, thereby implementing data transmission between user terminals of different types, reducing data transmission pressure of a server and saving network bandwidth resources.

Figure 12:
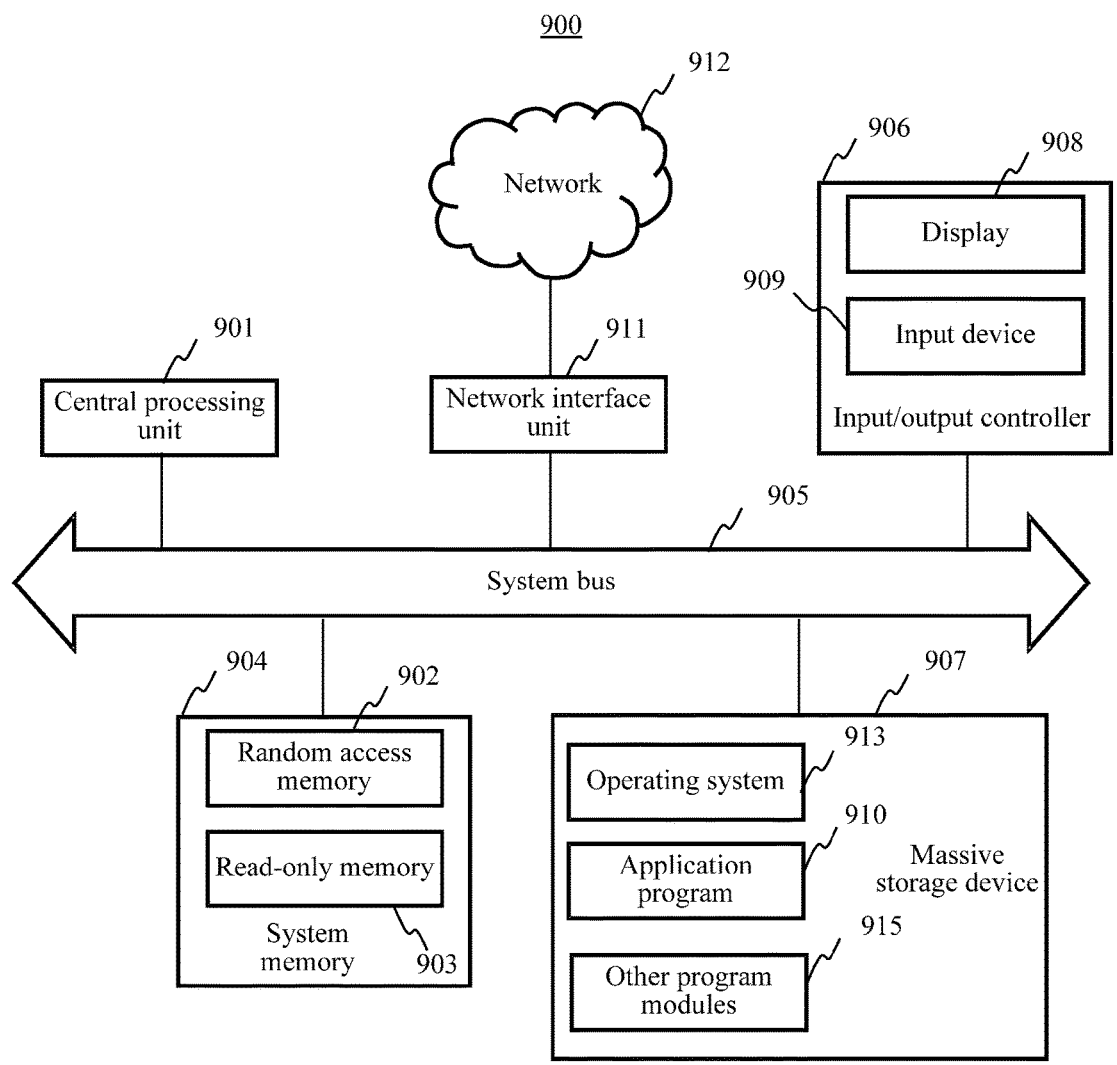
FIG. 12 is a schematic structural diagram of a server provided in an embodiment of the present invention.

FIG. 12 is a schematic structural diagram of a server provided in an embodiment of the present invention. The server 900 includes a central processing unit (CPU) 901, a system memory 904 including a random access memory (RAM) 902 and a read-only memory (ROM) 903, and a system bus 905 connecting the system memory 904 and the central processing unit 901. The server 900 further includes a basic input/output (I/O) system 906 that helps transmission of information between various devices inside a computer, and a massive storage device 907 configured to store an operating system 913, an application program 910, and other program modules 915.

The basic input/output system 906 includes a display 908 configured to display information and an input device 909, for example, a mouse, and a keyboard, that is used by a user to input information. The display 908 and the input device 909 are both connected to an input/output controller 910 of the system bus 905 to be connected to the central processing unit 901. The basic input/output system 906 may further include an input/output controller 910 to receive and process input from multiple other devices such as a keyboard, a mouse, or an electronic stylus. Similarly, the input/output controller 910 further provides output to a display screen, a printer or other types of output devices.

The massive storage device 907 is connected to a massive storage controller (not shown) of the system bus 905 to be connected to the central processing unit 901. The massive storage device 907 and its related computer readable media provide the server 900 with nonvolatile storage. That is, the massive storage device 907 may include computer readable media (not shown) such as a hard disk or a CD-ROM drive.

Without loss of generality, the computer readable media include computer storage media and communications media. The computer storage media include volatile and non-volatile, and removable and non-removable media implemented in any method or technology for storage of information such as computer-readable instructions, data structures, program modules or other data. The computer storage media include, but are not limited to, a RAM, a ROM, an electrically erasable programmable ROM (EEPROM), a flash memory or other solid-state memory technologies, compact disc ROM (CD-ROM), a digital versatile disk (DVD) or other optical storage devices, and a magnetic cassette, a magnetic tape, a magnetic disk storage device or other magnetic storage devices. Certainly, the person of ordinary skill in the art may know that the computer storage medium is not limited to the foregoing types. The system memory 904 and the massive storage device 907 may be generally referred to as a memory.

According to various embodiments of the present invention, the server 900 may further run on a remote computer connected to a network by using a network such as the Internet. That is, the server 900 may be connected to a network 912 by using a network interface unit 911 connected to the system bus 905, or may also be connected to a network or a remote computer system (not shown) of another type by using a network interface unit 911.

The memory further includes one or more programs. The one or more programs are stored in the memory. The processor is configured to perform, according to the programs stored in the memory, the foregoing data transmission method in FIG. 1 to FIG. 4.

Figure 13:
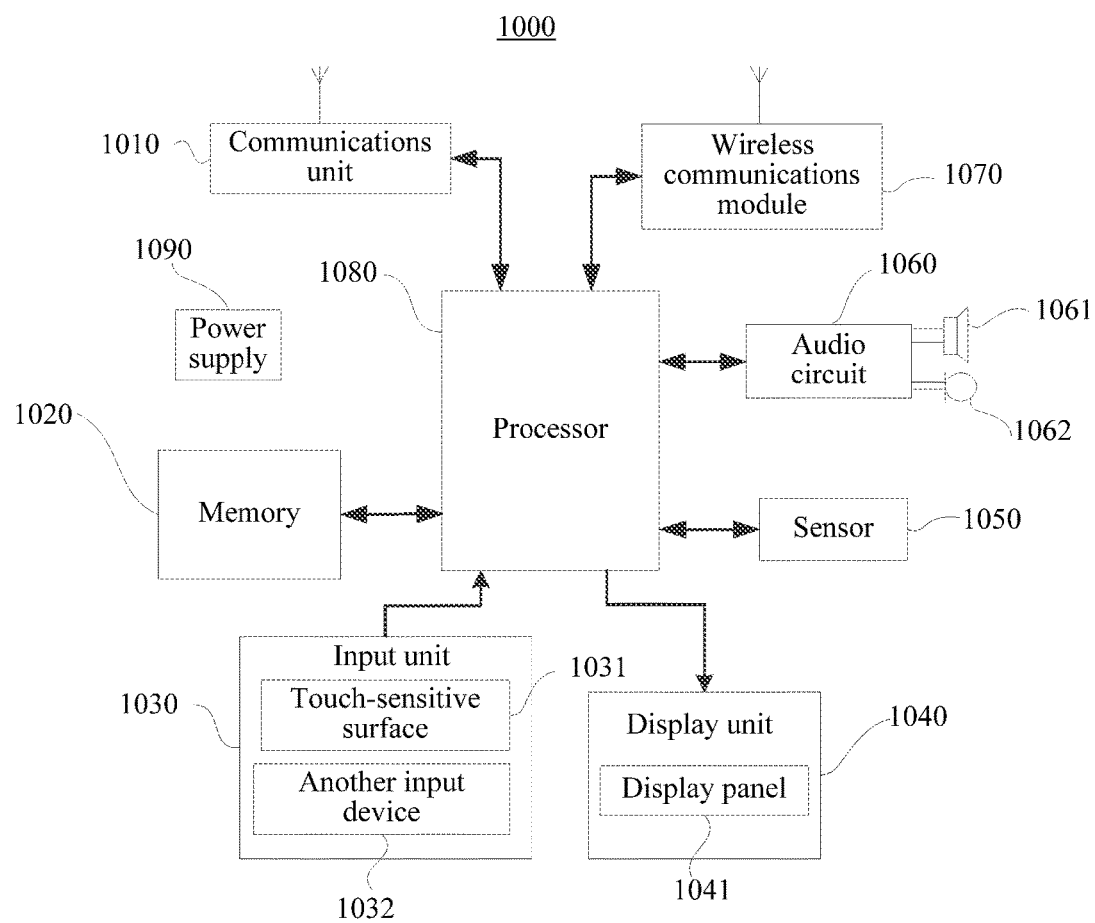
FIG. 13 is a structural block diagram of a user terminal provided in an embodiment of the present invention.

FIG. 13 is a structural block diagram of a user terminal according to an embodiment of the present invention. The user terminal 1000 may include components such as a communications unit 1010, a memory 1020 including one or more computer readable storage media, an input unit 1030, a display unit 1040, a sensor 1050, an audio circuit 1060, a Wireless Fidelity (WiFi) module 1070, a processor 1080 including one or more processing cores, and a power supply 1090. A person skilled in the art may understand that the structure of the terminal shown in FIG. 13 does not constitute a limitation to the terminal, and the terminal may include more components or fewer components than those shown in the figure, or some components may be combined, or a different component deployment may be used.

The communications unit 1010 may be configured to receive and send signals during an information receiving and sending process or a call process. The communications unit 1010 may be a network communications device, such as a radio frequency (RF) circuit, a router, or a modem. Particularly, when the communications unit 1010 is the RF circuit, the communications unit receives downlink information from a base station, then delivers the downlink information to one or more processors 1080 for processing, and sends related uplink data to the base station. Generally, the RF circuit serving as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 1010 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 1020 may be configured to store a software program and module. The processor 1080 runs the software program and module stored in the memory 1020, to implement various functional applications and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the user terminal 1000, and the like. In addition, the memory 1020 may include a high speed random access memory, and may also include a non-volatile memory, such as at least one magnetic disk storage device, a flash memory, or another volatile solid-state storage device. Accordingly, the memory 1020 may further include a memory controller, so that the processor 1080 and the input unit 1030 access the memory 1020.

The input unit 1030 may be configured to receive input digit or character information, and generate a keyboard, mouse, joystick, optical, or track ball signal input related to the user setting and function control. Preferably, the input unit 1030 may include a touch-sensitive surface 1031 and another input device 1032. The touch-sensitive surface 1031, which may also be referred to as a touch screen or a touch panel, may collect a touch operation of a user on or near the touch-sensitive surface (such as an operation of a user on or near the touch-sensitive surface 1031 by using any suitable object or accessory, such as a finger or a stylus), and drive a corresponding connection apparatus according to a preset program. Optionally, the touch-sensitive surface 1031 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 1080. Moreover, the touch controller can receive and execute a command sent from the processor 1080. In addition, the touch-sensitive surface 1031 may be a resistive, capacitive, infrared, or surface sound wave type touch-sensitive surface. In addition to the touch-sensitive surface 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information input by the user or information provided for the user, and various graphical user interfaces of the user terminal 1000. The graphical user interfaces may be formed by a graphic, text, an icon, a video, and any combination thereof. The display unit 1040 may include a display panel 1041. Optionally, the display panel 1041 may be configured by using a liquid crystal display (LCD), an organic light-emitting diode (OLED), or the like. Further, the touch-sensitive surface 1031 may cover the display panel 1041. After detecting a touch operation on or near the touch-sensitive surface 1031, the touch-sensitive surface 1031 transfers the touch operation to the processor 1080, so as to determine the type of the touch event. Then, the processor 1080 provides a corresponding visual output on the display panel 1041 according to the type of the touch event. Although, in FIG. 13, the touch-sensitive surface 1031 and the display panel 1041 are used as two separate parts to implement input and output functions, in some embodiments, the touch-sensitive surface 1031 and the display panel 1041 may be integrated to implement the input and output functions.

The user terminal 1000 may further include at least one sensor 1050, such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the user terminal 1000 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the user terminal 1000, are not further described herein.

The audio circuit 1060, a loudspeaker 1061, and a microphone 1062 may provide audio interfaces between the user and the user terminal 1000. The audio circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another terminal by using the communications unit 1010, or outputs the audio data to the memory 1020 for further processing. The audio circuit 1060 may further include an earplug jack, so as to provide communication between a peripheral earphone and the user terminal 1000.

To implement wireless communication, the user terminal may be configured with a wireless communications module 1070. The wireless communications module 1070 may be a WiFi module. WiFi is a short distance wireless transmission technology. The user terminal 1000 may help, by using the wireless communications module 1070, the user to receive and send e-mails, browse a webpage, access stream media, and so on, which provides wireless broadband Internet access for the user. Although FIG. 13 shows the wireless communications module 1070, it may be understood that the wireless communications unit is not a necessary component of the user terminal 1000, and when required, the wireless communications unit may be omitted as long as the scope of the essence of the present disclosure is not changed.

The processor 1080 is the control center of the user terminal 1000, and is connected to various parts of the mobile phone by using various interfaces and lines. By running or executing the software program and/or module stored in the memory 1020, and invoking data stored in the memory 1020, the processor 1080 performs various functions and data processing of the user terminal 1000, thereby performing overall monitoring on the mobile phone. Optionally, the processor 1080 may include one or more processing cores. Preferably, the processor 1080 may integrate an application processor and a modem. The application processor mainly processes an operating system, a user interface, an application program, and the like. The modem mainly processes wireless communication. It may be understood that the foregoing modem may also not be integrated into the processor 1080.

The user terminal 1000 further includes the power supply 1090 (such as a battery) for supplying power to the components. Preferably, the power supply may be logically connected to the processor 1080 by using a power management system, thereby implementing functions such as charging, discharging and power consumption management by using the power management system. The power supply 1090 may further include any component, such as one or more direct current or alternate current power supplies, a re-charging system, a power supply fault detection circuit, a power supply converter or an inverter, and a power supply state indicator.

Although not shown, the user terminal 1000 may further include a camera, a Bluetooth module, and the like, which are not further described herein.

In this embodiment, the terminal further includes one or more programs. The one or more programs are stored in a memory and configured to be executed by one or more processors. The one or more programs contain instructions used for implementing the data transmission method according to the embodiments of the present invention.

The sequence numbers of the above embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A data transmission method, wherein the method comprises:
    acquiring a use record and a browsing record when each user uses a multimedia file according to a historical browsing record of each user;
    acquiring, according to the use record, a predicted time that each user plays the multimedia file by using a type of user terminal;
    acquiring a popularity order of multimedia files according to the browsing record;
    generating, for each type of user terminal according to the predicted time, advance backup data of the multimedia files in the popularity order;
    sending the advance backup data corresponding to multimedia files to N types of user terminals, wherein N≥1;
    receiving a data request that is sent by an (N+1)th type of user terminal and is used for requesting the multimedia file; and
    sending, to the (N+1)th type of user terminal, a link address, of the advance backup data corresponding to the multimedia file, in the N types of user terminals, the link address being used for instructing the (N+1)th type of user terminal to acquire, from the N types of user terminals, data corresponding to the multimedia file.

2. The method according to claim 1, wherein
    the use record at least comprises: a type of a user terminal playing the multimedia file and a time that the multimedia file is played on each type of user terminal; and
    the browsing record at least comprises: the number of times that the multimedia file is played, duration that the multimedia file is played, and a bit rate when the multimedia file is played.

3. The method according to claim 2, wherein the acquiring, according to the use record, a predicted time that each user plays the multimedia file by using each type of user terminal comprises:
    performing clustering according to types of the multimedia files played by using each type of user terminal, to obtain the predicted time that each user plays the multimedia file by using each type of user terminal.

4. The method according to claim 3, wherein the performing clustering according to types of the multimedia files played by using each type of user terminal, to obtain the predicted time that each user plays the multimedia file by using each type of user terminal comprises:
    performing, for each user, according to a k-means clustering algorithm and a time sequence that the user plays the multimedia files by using each type of user terminal, clustering on the types of the multimedia files played by the user by using each type of user terminal, to obtain the predicted time that the user plays the multimedia file by using each type of user terminal, wherein the time sequence is a discrete sequence formed by sampling time points, when the user plays the multimedia file by using each type of user terminal, within a sampling period.

5. The method according to claim 4, after the obtaining the predicted time that the user plays the multimedia file by using each type of user terminal, further comprising:
    performing sampling again on a use record when the user plays the multimedia file by using each type of user terminal, and during sampling again, using a sampling period and sampling time points same as those of the time sequence; and
    calibrating, according to the use record, of the user, obtained through sampling again, the predicted time, to obtain the calibrated predicted time.

6. The method according to claim 2, wherein the acquiring a popularity order of multimedia files according to the browsing record comprises:
    performing clustering according to the number of times that each user plays the multimedia files by using each type of user terminal, to obtain the popularity order of the multimedia files.

7. The method according to claim 6, wherein the performing clustering according to the number of times that each user plays multimedia files by using each type of user terminal, to obtain the popularity order of the multimedia files comprises:
    performing, for each user, according to a k-means clustering algorithm and a time sequence that the user plays the multimedia files by using each type of user terminal, clustering on the valid number of times that the user plays the multimedia files by using each type of user terminal, to obtain the popularity order of the multimedia files, wherein the time sequence is a discrete sequence formed by sampling time points, when the user plays the multimedia file by using each type of user terminal, within a sampling period.

8. The method according to claim 7, before the performing, according to a k-means clustering algorithm and a time sequence that the user plays the multimedia files by using each type of user terminal, clustering on the valid number of times that the user plays the multimedia files by using each type of user terminal, further comprising:
    selecting, from the browsing records, a browsing record whose duration that the multimedia file is played is greater than a preset threshold as a valid browsing record; and
    obtaining, according to the valid browsing record, the valid number of times that the multimedia file is played.

9. The method according to claim 7, after the obtaining the popularity order of the multimedia files, further comprising:
performing sampling again on the browsing record that the user plays the multimedia file by using each type of user terminal, and during sampling again, using a sampling period and sampling time points same as those of the time sequence; and
calibrating, according to the browsing record of the user obtained through sampling again, the popularity order, to obtain the calibrated popularity order.

10. The method according to claim 2, wherein the generating, for each type of user terminal according to the predicted time, advance backup data of the multimedia files in the popularity order comprises:
performing mapping on the predicted time when the multimedia file is played by using each type of user terminal and the popularity order of the multimedia files, to obtain a correspondence between a multimedia file and a user terminal; and
generating, for each type of user terminal according to the correspondence between a multimedia file and a user terminal, advance backup data of the multimedia files in the popularity order.

11. The method according to claim 1, wherein the sending advance backup data corresponding to multimedia files to N types of user terminals comprises:
determining the N types of user terminals according to a type of a user terminal corresponding to each multimedia file in the predicted time; and
sending the advance backup data corresponding to the multimedia files to the N types of user terminals.

12. The method according to claim 1, after the sending, to the (N+1)th type of user terminal, a link address, of advance backup data corresponding to the multimedia file, in the N types of user terminals, further comprising:
monitoring a bandwidth output of each type of user terminal according to a preset threshold; and
reducing, when a bandwidth output by an ith type of user terminal in the N types of user terminals to the (N+1)th type of user terminal is greater than the preset threshold, a bandwidth output of the ith type of user terminal, and adding advance backup data of the multimedia file sent by a jth type of user terminal in the N types of user terminals to the (N+1)th type of user terminal, wherein $0 \leq i, j \leq N$.

13. The method according to claim 1, further comprising:
sending a data request corresponding to the multimedia file to the server;
receiving the link address, sent by the server according to the data request, of the advance backup data corresponding to the multimedia file, in N types of user terminals, the advance backup data being backup data that is sent by the server to the N types of user terminals and corresponds to the multimedia file;
sending a first data request to the N types of user terminals according to the link address; and
receiving advance backup data that is sent by the N types of user terminals according to the first data request and corresponds to the multimedia file.

14. The method according to claim 13, after the receiving advance backup data that is sent by the N types of user terminals according to the first data request and corresponds to the multimedia file, further comprising:
receiving, when a bandwidth output by an ith type of user terminal in the N types to an (N+1)th type of user terminal is greater than a preset threshold, advance backup data, of the multimedia file, sent by a jth type of user terminal in the N types, wherein $0 \leq i, j \leq N$.

15. The method according to claim 13, after the receiving advance backup data that is sent by the N types of user terminals according to the first data request and corresponds to the multimedia file, further comprising:
receiving a data request from an Mth type of user terminal for the multimedia file; and
sending, according to the data request, data corresponding to the multimedia file to the Mth type of user terminal, wherein $N+1 \leq M$.

16. A data transmission apparatus, comprising:
a processor; and
a memory coupled to the processor, wherein the processor is configured to:
send a data request corresponding to a multimedia file to a server;
receive a link address, sent by the server according to the data request, of advance backup data corresponding to the multimedia file, in N types of user terminals, the advance backup data being backup data that is sent by the server to the N types of user terminals and corresponds to the multimedia file;
send a first data request to the N types of user terminals; and
receive the advance backup data that is sent by the N types of user terminals according to the first data request and corresponds to the multimedia file;
wherein the server is further configured to:
acquire a use record and a browsing record when each user uses a multimedia file according to a historical browsing record of each user;
acquire, according to the use record, a predicted time that each user plays the multimedia file by using a type of user terminal;
acquire a popularity order of multimedia files according to the browsing record; and
generate, for each type of user terminal according to the predicted time, advance backup data of the multimedia files in the popularity order.

17. The apparatus according to claim 16, wherein the processor is further configured to:
after the advance backup data that is sent by the N types of user terminals according to the first data request and corresponds to the multimedia file is received, when a bandwidth output by an ith type of user terminal in the N types to an (N+1)th type of user terminal is greater than a preset threshold, receive the advance backup data, of the multimedia file, sent by a jth type of user terminal in the N types, wherein $0 \leq i, j \leq N$.

18. The apparatus according to claim 16, wherein the processor is further configured to:
after the advance backup data that is sent by the N types of user terminals according to the first data request and corresponds to the multimedia file is received, receive a data request from an Mth type of user terminal for the multimedia file; and
send, according to the data request received by the fourth receiving module, data corresponding to the multimedia file to the Mth type of user terminal, wherein $N+1 \leq M$.

19. The apparatus according to claim 16, wherein the processor is further configured to:
receive the advance backup data, sent by the server, corresponding to multimedia files;
receive a first data request, sent by an (N+1)th type of user terminal, for a multimedia file, the first data request being sent by the (N+1)th type of user terminal according to a link address, of advance backup data corresponding to the multimedia file, in N types of user terminals, and the link address being fed back by the server to the (N+1)th type of user terminal after the (N+1)th type of user terminal sends, to the server, a data request for the multimedia file, wherein N≥1;

send, according to the first data request received by the receiving module, advance backup data corresponding to the multimedia file to the (N+1)th type of user terminal.

20. A network system, comprising a server and at least one type of user terminal, the server being connected to each type of user terminal, wherein:

the server is configured to:
acquire a use record and a browsing record when each user uses a multimedia file according to a historical browsing record of each user;
acquire, according to the use record, a predicted time that each user plays the multimedia file by using a type of user terminal;
acquire a popularity order of multimedia files according to the browsing record;
generate, for each type of user terminal according to the predicted time, advance backup data of the multimedia files in the popularity order;
send the advance backup data corresponding to multimedia files to N types of user terminals, wherein N≥1,
receive a data request that is sent by an (N+1)th type of user terminal and is used for requesting a multimedia file, and
send, to the (N+1)th type of user terminal, a link address, of advance backup data corresponding to the multimedia file, in the N types of user terminals, the link address being used for instructing the (N+1)th type of user terminal to acquire, from the N types of user terminals, data corresponding to the multimedia file; and each type of user terminal is configured to:
send the data request corresponding to the multimedia file to the server,
receive the link address, sent by the server according to the data request, of the advance backup data corresponding to the multimedia file, in N types of user terminals, the advance backup data being backup data that is sent by the server to the N types of user terminals and corresponds to the multimedia file,
send a first data request to the N types of user terminals according to the link address received by the first receiving module, and
receive advance backup data that is sent by the N types of user terminals according to the first data request and corresponds to the multimedia file.

* * * * *